United States Patent [19]

Legrand

[11] 4,257,670
[45] Mar. 24, 1981

[54] OPTICAL PEEPHOLE DEVICE INSERTABLE IN THICK WALLS FOR PANORAMIC VIEWING THERETHROUGH

[76] Inventor: Daniel L. Legrand, 61 Ave. des Sources Chateau-Robert, Saint-Yorre, France

[21] Appl. No.: 941,942

[22] Filed: Sep. 13, 1978

[51] Int. Cl.³ .................... G02B 21/00; G02B 25/04
[52] U.S. Cl. ................................. 350/8; 350/54; 350/319
[58] Field of Search .................. 350/8, 319, 9, 219, 350/54, 198, 24, 121, 122, 127, 175, 52, 254

[56] References Cited

U.S. PATENT DOCUMENTS

| | | | |
|---|---|---|---|
| 1,445,284 | 2/1923 | Bell et al. | 350/54 |
| 1,879,412 | 9/1932 | Mueller | 350/8 |
| 2,146,662 | 2/1939 | Van Albada | 350/198 |
| 2,262,203 | 11/1941 | Redstone et al. | 350/319 |
| 2,313,460 | 3/1943 | Warmisham | 350/8 |
| 2,538,077 | 1/1951 | Blosse | 350/319 |
| 2,620,706 | 12/1952 | Levin | 350/8 |
| 3,051,050 | 8/1962 | Kohler | 350/8 |
| 3,575,495 | 4/1971 | Tibbetts | 350/219 |
| 3,989,349 | 11/1976 | Besenmatter et al. | 350/8 |

*Primary Examiner*—John K. Corbin
*Assistant Examiner*—B. W. de los Reyes
*Attorney, Agent, or Firm*—Michael Ebert

[57] ABSTRACT

An optical device insertable through a peephole in the thick wall of a chamber such as a bank vault, making it possible for an observer to obtain a panoramic view of objects dispersed within the interior thereof. The device is constituted by an optical system composed of three lens assemblies disposed serially along a common optical axis. The first assembly has wide angle characteristics to develop in front of this assembly a virtual image of the objects in the interior. The second assembly has an elongation nearly equal to the thickness of the wall, the second assembly having convergent characteristics to derive from the virtual image a final image which is formed adjacent the exit of this assembly. The third assembly has accommodation characteristics to permit an observer's eye located behind it to see the final image with an apparent diameter essentially equal to that at which the initial image can be seen at the entry of the second assembly. As a consequence, an observation of objects through the optical system is essentially equivalent in image quality to that obtainable had the observation of the initial image been made directly with the first and third assemblies.

9 Claims, 2 Drawing Figures

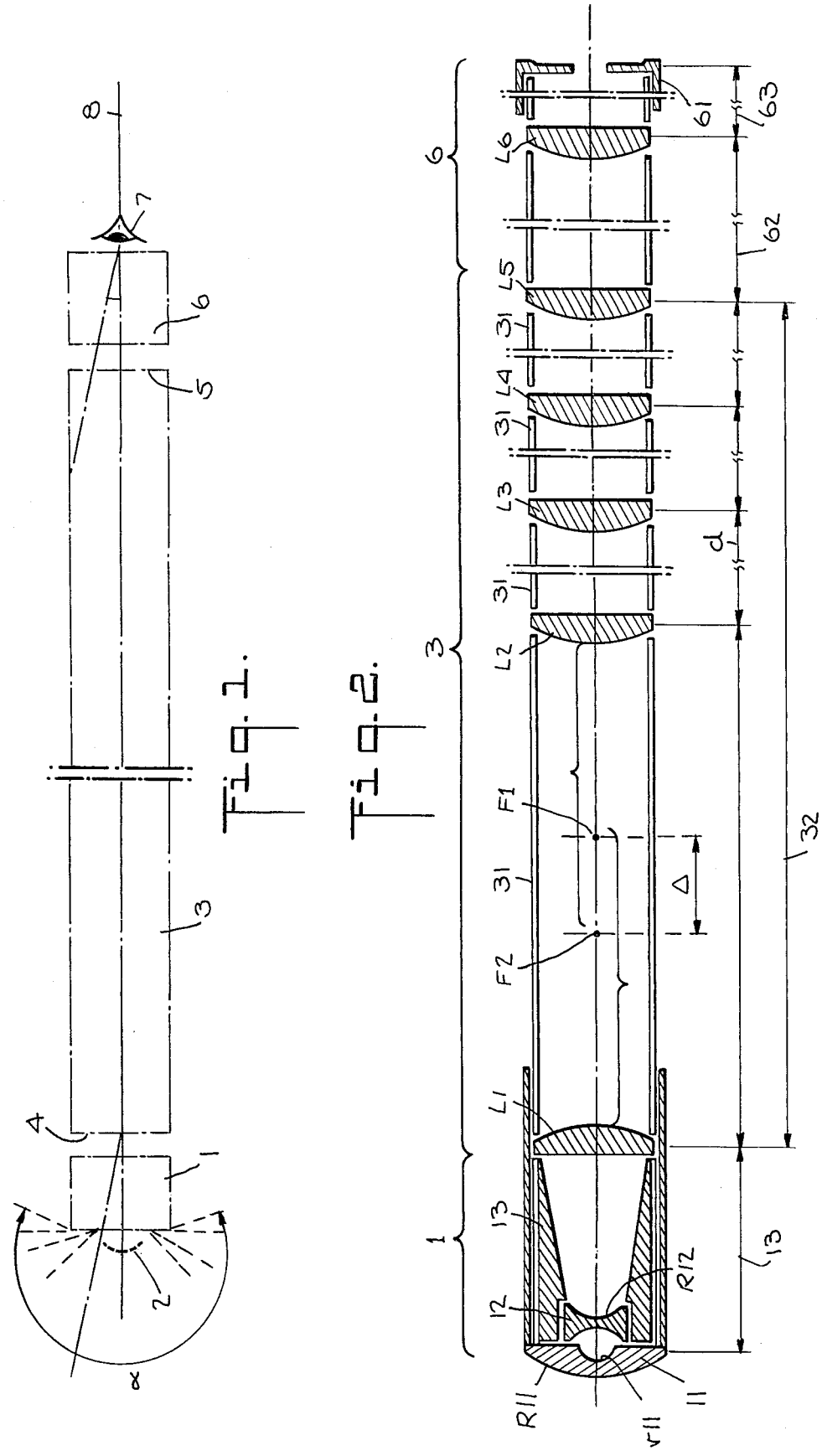

OPTICAL PEEPHOLE DEVICE INSERTABLE IN THICK WALLS FOR PANORAMIC VIEWING THERETHROUGH

BACKGROUND OF INVENTION

This invention relates generally to optical peephole devices, and more particularly to an optical device which is insertable in the peephole of a thick-walled chamber such as a bank safe, making it possible to inconspicuously but almost fully inspect the interior thereof.

Devices are known, commonly called optical peepholes, which make it possible for an observer located behind a door to almost entirely perceive those objects which are present on a stairway landing, provided, of course, that these objects are sufficiently illuminated. Such optical peephole devices are generally constituted by an optical doublet comprising either a pair of thick-edged lenses, or a meniscus and a thick-edged lens. This doublet forms a strongly divergent optical system and, depending on certain arrangements or on the diopters of its optical elements, it affords a virtual image of the various objects located on the stair landing. Usually this virtual image is observed with the aid of a convergent lens which at the same time allows some degree of magnification of the image and accommodation to the eye.

One can readily appreciate that a peephole optical device for this purpose cannot be very long, otherwise it would produce an image having very poor luminosity. Thus an optical peephole device of the above-described type is not applicable to observations through walls having a thickness greater than about ten centimeters.

To ensure the security of certain chambers or enclosures, such as strongboxes, safes or bank vaults, one must be able to discreetly carry out observations at regular intervals from the exterior of the chamber. To facilitate such observation, it has heretofore been proposed that television cameras be placed at several points within the chamber, permitting the field of view of the cameras to be displayed on television screens. Such a closed-circuit television system, although very effective, is also very expensive, which is a distinct practical drawback.

It has also been proposed that the interior of the enclosure be inspected with the aid of an endoscope of the medical type, or by a periscope. A serious drawback of both such devices is that their field of view is quite limited (for example, to a solid angle of 30° to 60°). As a consequence, it is necessary to make these narrow angle devices turn on their axes to sweep the entire field. This renders the observation procedure conspicuous, which is undesirable. The fact that such devices must be projected somewhat into the interior of the enclosure also causes them to be conspicuous and more costly.

SUMMARY OF THE INVENTION

In view of the foregoing, the main object of this invention is to provide an optical peephole device insertable through the wall of a thick-walled chamber, making it possible for an observer to obtain a panoramic view of the interior of the chamber and the objects dispersed therein with a quality of observation substantially equivalent to that obtainable with an optical peephole in a thin-walled chamber.

More particularly, an object of the invention is to provide a device for observation through a thick-walled chamber which makes use of an optical system composed of three lens assemblies, acting in combination and arranged successively along a common central axis, the first assembly having wide angle characteristics to develop in front of the assembly an initial virtual image of the objects located in the chamber, the second assembly having a length between its optical entry and exit approaching the thickness of the wall and having convergence characteristics to develop adjacent its exit a final image of the initial image, and a third assembly having accommodation characteristics to permit an observer's eye located behind this assembly to see the final image in front thereof with an apparent diameter that is essentially equal to that at which the initial image is seen from the entry to the second assembly.

The main advantage of a three lens assembly optical system in accordance with the invention is that its image quality, particularly with respect to luminosity, is effectively equivalent to that obtainable had the initial image been directly observed through the accommodation optical assembly.

Briefly stated, these objects are attained in a device having an optical system in which the first "wide-angle" lens assembly consists of a doublet formed by a thick-edged meniscus whose front face has a radius of curvature that is large relative to the radius of curvature of its hermispherical rear face, and a double-concave lens behind the meniscus having opposed faces which are essentially symmetrical with respect to each other, these faces having radii and diameters that are essentially equal to each other and appreciably greater than those of the rear face of the meniscus.

The second convergent lens assembly is preferably made up of a series of five identical lenses whose successive distances from each other are slightly less than twice their focal length. As a result, the linear magnification of the assembly is substantially greater than unity and is close to two. The third accommodation lens assembly preferably consists of a plano-convex lens and an eyepiece spaced from each other by a distance equal to one-fourth to one-half the focal length of the lens.

In the optical system according to the invention, the second assembly is formed by a series of five lenses, the first of which is the entry to this assembly and the fifth of which is the exit thereof, the second assembly functioning as an image translator. The second assembly is so spaced along the central axis of the system from the first assembly whereby the initial virtual image produced by the first assembly is located in a zone lying between the object focus of the first lens in the second assembly and this lens at a point close to the object focus. As a result, the final image produced in the second assembly of the virtual image is adjacent the fifth or exit lens thereof.

In this optical system, the distance of the third assembly from the exit of the second assembly is adjusted to provide a value equal to about one-half the focal length of the plano-convex lens included in the third assembly. As a result, the image seen by the observer through the third assembly is a virtual image which is easily perceptible to the eye owing to the adjustability of the assembly which permits such accommodation.

The above-described characteristics of the three assembly optical system makes it possible to design the system for any desired length so that within reasonable limits, the system can be adapted to function as a peephole device for practically any thickness of chamber wall.

Thus for a given set of dimensions, taking into account the distance from the entry or first lens of the second assembly to the first assembly and the distance from the accommodation lens of the third assembly to the exit or fifth lens of the second assembly, as well as the elongation of the five lenses in the second assembly, which is equal for example to ten centimeters, the relationship giving the focal length of the five lenses of the second assembly as a function of the thickness of the chamber wall to be traversed can be obtained from the following equation:

$$F \geq (e-10)/8.$$

Moreover, taking into account the relationship set forth above concerning the position of the lenses in the second assembly with respect to each other and recommending a negative optical interval, say equal to one third of the focal length, the value of the spacing between two lenses of the second assembly can advantageously be given by the relationship:

$$d = 2f - \Delta$$

or $$d = 2f - f/3,$$

or finally, $$d = 5f/3$$

OUTLINE OF THE DRAWINGS

For a better understanding of the invention as well as other objects and further features thereof, reference is made to the following detailed description to be read in conjunction with the accompanying drawings wherein:

FIG. 1 schematically illustrates the function of three-optical assemblies which constitute an optical system in accordance with the invention; and FIG. 2 is a section taken through the central optical axis of a preferred embodiment of this system.

DESCRIPTION OF THE INVENTION

The Basic System:

Referring now to FIG. 1, there is schematically shown an optical system in accordance with the invention constituted by three lens assemblies 1, 3 and 6 successively arranged in cooperative relation along a common central optical axis 8 to inspect objects situated in the region of view encompassed by the first assembly 1.

The first assembly 1 is of the divergent or "wide-angle" type adapted to perceive luminous objects located within a solid angle α greater than 180° to produce a virtual image 2 at a position slightly ahead of this assembly.

The second lens assembly 3 functions as an image translator and is provided with an entry 4 and an exit 5, this assembly serving to produce an appreciably larger image located adjacent exit 5. The third lens assembly 6 functions to provide accommodation to permit the eye 7 of an observer placed behind this assembly to see the image adjacent exit 5 of the second assembly at essentially the same apparent diameter as virtual image 2 is seen at the entry 4 of the second assembly.

Preferred Embodiment:

Referring now to FIG. 2 there is shown a preferred embodiment of a three assembly optical system for a peephole device insertable through a thick wall, the three lens assemblies 1, 3 and 6 shows in this figure corresponding in function to the like-numbered assemblies shown in FIG. 1.

First lens assembly 1 is made up of a doublet constituted by a thick-edged meniscus 11 whose front face has a radius of curvature R11 that is large compared to the radius of curvature r11 of its rear face, the rear face having a substantially hemispherical or half-ball shape. Behind meniscus 11 is a double-concave lens 12 having symmetrically-arranged opposed faces that have identical radii R12. The diameter of the lens faces of lens 12 is substantially greater than the diameter of the hemispherical face of meniscus 11 so that all of the light rays passing through the hemispherical face are collected by the double-concave lens 12. This factor contributes to the luminosity of the image.

The second lens assembly 3 is made up of five identical plano-convex lenses L1, L2, L3, L4 and L5 that are equidistantly spaced from each other by means of spacers 31 of equal length. The length of any spacer 31 is such that the object focus of the associated lens, such as object focus F2 of lens L2, is located at a point on central axis 8 which is ahead of the image focus of the preceding lens which in this instance is image focus F'1 of lens L1. The distance between object focus F2 and image focus F'1 is termed the optical interval Δ.

In FIG. 2, only lenses L1 and L2 are represented at their real distances, but it is to be understood that the same relationship applies to lines L3, L4 and L5. The position of entry lens L1 of the second assembly relative to the doublet 12 of the first assembly is such that its object focus F1 (not shown in FIG. 2) is slightly ahead of this doublet. This distance is determined by a spacer 13 between doublet 12 and lens L1, which spacer is internally tapered so that its internal diameter increases progressively from that of the diameter of the doublet to a diameter approaching that of lens L1.

To increase the luminosity and reduce chromatic aberration, the optical system is arranged so that the plano-convex entry lens L1 of the second assembly 3 has its planar face oriented toward the front, whereas the other four plano-convex lens L2, L3, L4 and L5 have their planar faces oriented toward the rear.

The third assembly 6 which provides accommodation is made up of a plano-convex lens L6 behind which is an eyepiece 61. Lens L6 has a focal length that is preferably greater than the focal length of lenses L1 to L5 of the second assembly, for example twice as great. Lens L6 is located behind lens L5 by a distance 62 equal to about one-half of its focal length. The eyepiece 61 is located a distance 63 from lens L6 equal in this embodiment to about 3 centimeters.

It is to be noted that the total distance defined by spaces 13, 62 and 63 is about 10 centimeters. These spaces can be varied slightly depending on the desired total length of the peephole device. In practice, however, one must adjust the cumulative length of the four spacers 31 in the second assembly plus the thickness of the lenses therein in order to increase or reduce the length of the device to conform to the thickness of the wall through which it must pass.

The following are practical examples of how these different lengths are determined.

Example 1:

Assuming a wall thickness of 50 centimeters, the necessary length of the second assembly is then 40 centimeters. Using sumbol d as representing the length of spacer 31, we then have d=40/4=10 centimeters. Applying the above relationship we obtain:

$$f = 3 \times 10/5 = 6 \text{ centimeters.}$$

Thus one should choose for lenses L1, L2, L3, L4 and L5, plano-convex lenses having a radius of curvature of about thirty millimeters. Or, with a glass having a refractive index of about 1.53, a focal length of six centimeters. The diameter of these lenses is 14 millimeters and their thickness at the crown is 5 millimeters.

For the divergent doublet, R11=25 millimeters and r11=4 millimeters. Diameter D11 of meniscus 11 is 18 millimeters, diameter D12 of meniscus 12 is 10 millimeters, and radius R12 of its faces is 7 millimeters. Lens L6 of the accommodation assembly has a diameter of 14 millimeters, a thickness of 5 millimeters and a radius of the front face equal to 63 millimeters. Lens 6 is located from 7 to 10 centimeters behind lens L5 and 3 centimeters in front of eyepiece 61.

Example 2:

The assumed thickness of the wall is one meter. The first and third assemblies 1 and 6 can be identical with those in Example 1. As a result, the length of the second assembly 3, the translator, will now be 90 centimeters. We then have:

$$d = 90/4 = 22.5 \text{ cm and } f = 3 \times 22.5/5 = 13.4 \text{ cm.}$$

Thus one should choose, for lenses L1, L2, L3, L4 and L5, plano-convex lenses having a focal length of 13.4 centimeters.

It should also be noted that the principles underlying the invention are applicable to the optical treatment of infrared radiation emanating from the objects being observed, provided that the optics are adapted to dealing with these rays. An optical device within the scope of the invention which operates in the infrared light region is advantageous in that it permits observation in the event of a failure or cutoff of electric power. This is of significant value when for example monitoring strongboxes or bank vaults. Finally, it should be noted that the device according to the invention can be used with cameras for taking photographic views, by a simple choice of the last lens L6 in the third assembly which will then be suitable for producing an image capable of being handled by such equipment.

While there has been shown and described preferred embodiments of an optical peephole device insertable in thick walls for panoramic viewing therethrough in accordance with the invention, it will be appreciated that many changes and modifications may be made therein without, however, departing from the essential spirit thereof.

I claim:

1. An optical device insertable through a peephole in the wall of a chamber such as a bank vault having a thickness greater than about 10 centimeters, making it possible for an observer to obtain a panoramic view of the interior and of the objects dispersed therein; said device being constituted by an optical system formed by three lens assemblies disposed successively in cooperative relation along a common central optical axis in said peephole; said system comprising:

A. a wide-angle first lens assembly placed in the peephole adjacent the chamber side thereof to create a virtual image of the interior and the objects dispersed therein at a position in front of this assembly;
   B. A convergent second lens assembly placed in the peephole behind the first assembly and having a length approaching the thickness of the wall, said second assembly having an entry and exit to optically derive from the virtual image developed by the first assembly a final image which is positioned adjacent said exit; and
   C. an accommodation third lens assembly placed in the peephole behind the second assembly and accessible to the observer to permit an observer's eye located behind it to see the final image developed by the second assembly at an apparent diameter which is essentially equal to that at which the virtual image is seen from the entry of the second assembly whereby objects in the interior may be seen in a manner essentially equivalent in image quality to that observable when made directly with the first and third assemblies;
   D. said first assembly comprises a doublet constituted by a thick edged meniscus whose front face has a radius of curvature that is large relative to that of its rear face which has a hemispherical formation, and a double-concave lens behind the meniscus having radii and a diameter substantially greater than those of the rear face of the meniscus, said second assembly comprises a series of five identical lenses, the successive distance between these lenses being slightly less than twice their focal length, the first lens being the entry and the fifth lens being the exit of the second assembly.

2. A device as set forth in claim 1, wherein said third assembly is constituted by a plano-convex lens and an eyepiece which are spaced from each other by a distance that is between one fourth and one half the focal lens of this lens.

3. A device as set forth in claim 1, wherein the second assembly is spaced from the first assembly by a distance at which the initial image is located in a zone lying between the object focus of the entry lens in the second assembly and the entry lens and adjacent this object focus whereby the final image is adjacent the exit lens.

4. A device as set forth in claim 1, wherein said five lenses are of the plano-convex type.

5. A device as set forth in claim 4, wherein said wall has a thickness of fifty centimeters and the distance between each of said five lenses is ten centimeters.

6. A device as set forth in claim 5 wherein each of said five plano-convex lenses has a focal length of about six centimeters.

7. A device as set forth in claim 4 wherein said wall has a thickness of one meter and the distance between each of said five lenses is 24.8 centimeters, each lens having a focal length of 13.4 centimeters.

8. A device as set forth in claim 4, wherein the entry lens has its planar face oriented toward the entry and the other four lenses have their planar faces oriented toward the exit.

9. A device as set forth in claim 2, wherein the position of the third assembly relative to the second assembly is adjusted to provide a distance therebetween which is equal to about one-half the focal length of said plano-convex lens whereby the image observed through said third assembly is a virtual image easily perceptible to the eye of the observer.

* * * * *